Patented Mar. 6, 1928.

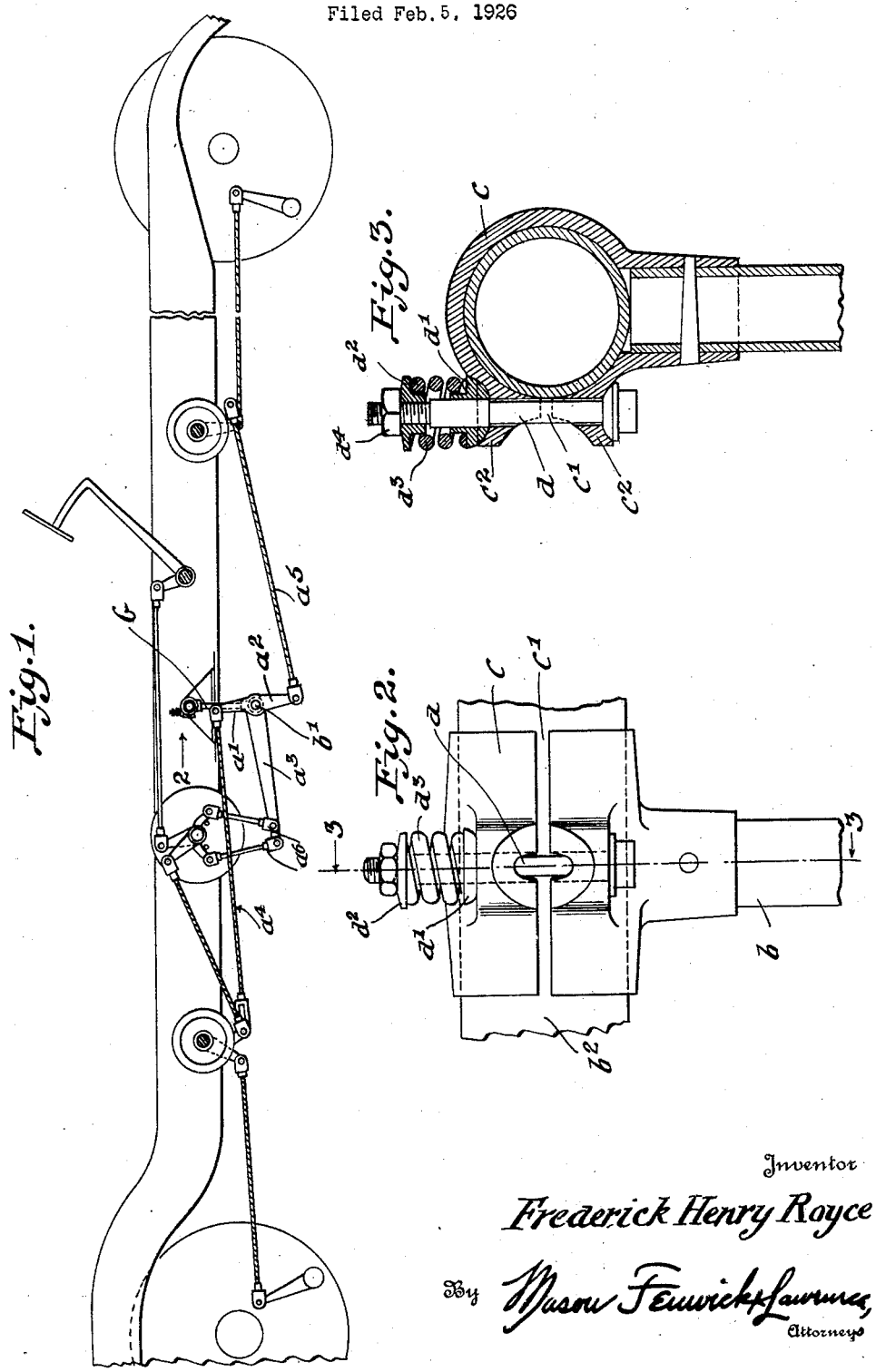

1,661,963

UNITED STATES PATENT OFFICE.

FREDERICK HENRY ROYCE, OF WEST WITTERING, NEAR CHICHESTER, ENGLAND, ASSIGNOR TO ROLLS-ROYCE LIMITED, OF NIGHTINGALE ROAD, DERBY, ENGLAND.

BRAKE SYSTEM FOR VEHICLES.

Application filed February 5, 1926, Serial No. 86,159½, and in Great Britain February 5, 1925.

This invention has reference to brake systems for four wheel vehicles where the brakes are applied to all four wheels.

In such systems it is necessary or desirable to embody in the system a balancing device for the purpose of evenly distributing the applied force between the front and back wheels.

One form of device adopted for the purpose consists of a three-arm T-shaped lever, one arm of which is operable by the operator and the other arms are operably connected to the front and back wheel brakes respectively. The three arm lever is fulcrumed and rocks on a pivot or other suitable support at a suitable place within the triangle formed by the points of attachment of the several arms to their respective operating and operated devices; and the pivot or support is attached to one end of a link, which link is at the other end hinged to the frame, so that when the lever is operated by the driver and in its turn operates the brakes, if greater resistance is offered by one set of brakes and its intermediate mechanism than by the other, the three arm lever will move bodily the link swinging until the resistances are equal.

In brake systems comprising such a device, as described, in the initial stages of applying the brakes, owing to the difficulty of equalizing resistances, the desired functioning of the lever is or may be disturbed, the play of forces may, owing to the fulcrum being adaptable, cause the three arm lever to fulcrum or rock in the first instance around an attachment or support other than the true fulcrum. The object of this invention is to overcome this drawback, and to render the balancing device more efficient in other ways.

According to this invention I introduce between the link and the frame a friction device, which may take any suitable form in which relatively moving members are put into frictional engagement: for example by an arrangement as illustrated in the drawings hereinafter referred to.

In the accompanying drawings is illustrated an example of my invention.

Fig. 1 is a diagrammatic view of the chassis in elevation. Fig. 2 is a view of the upper end of the link in the direction of arrow 2 in Fig. 1, and Fig. 3 is a section on line 3—3 of Fig. 2.

$a^1$ $a^2$ and $a^3$ are the rigidly connected arms of a three-arm lever respectively attached to the operable cables $a^4$ and $a^5$ of the front and back wheel brakes and the operating rods $a^6$, by either of which the three arm lever is operated. The brake rod A is suitably connected to the rods $a^6$ to control the operation of all the brakes.

$b$ is the swinging link on which the three arm lever is fulcrumed at $b^1$ and which is suspended on a pivot $b^2$ projected from the frame. $c$ is the boss of the link with a split or gap $c^1$ and with (formed integral therewith) perforated bosses $c^2$. $d$ is a bolt passing through the perforations, $d^1$ and $d^2$ are washers threaded on such bolt, $d^3$ is a spiral spring reacting between such washers, and $d^4$ a nut securing the assembly. Preferably there is a clearance between the bolt and the walls of the perforations, and the head of the bolt and the washer $d^1$ are provided with spherical faces which fit corresponding spherical sockets in the bosses $c^2$.

It could be arranged for the spring to be between the head of the bolt and one of the bosses $c^2$, and it might be arranged to dispense with the washers $d^1$ and $d^2$.

By apparatus made according to this invention the link can be made to temporarily maintain its position and the three arm lever accordingly to rock on the true fulcrum during the initial movements of the brake members.

What I claim is:—

1. In a four wheel brake system, the combination with a frame having wheels journaled thereto at opposite ends thereof, and brakes controlling the rotation of said wheels, of a brake rod pivoted to said frame, a link having one end thereof pivoted to said frame, means for varying the friction between said link and said frame, a lever pivoted intermediate its ends to the free end of said link, an arm extending rigidly from said lever, means operably connecting the opposite ends of said lever to the brakes at opposite ends of said frame, and means connecting said rod to the free end of said arm to control the application of the brakes to all of said wheels.

2. In a four wheel brake system, the combination with a frame having wheels journaled therein at opposite ends thereof, brake mechanism controlling the rotation of said wheels, said mechanism including a pivot pin extending from said frame, a link having at one end thereof a split sleeve rotatable on said pin, means connected to the split ends of said sleeve to vary the friction between said sleeve and said pin, and means pivotally connected to the free end of said link and to said brakes to control the operation of said brakes.

3. In a four wheel brake system, the combination with a frame having brake controlled wheels at opposite ends thereof, of a pivot pin extending laterally from said frame, a cylindrical sleeve on said pin and having a slot cut therethrough parallel to the axis thereof, said sleeve being provided with apertured bosses on opposite sides of said slot, a bolt extending through the apertures of said bosses, and having a head engaging one of said bosses, a nut screwthreaded on the shank of said bolt a coil spring interposed between the nut and the other boss, a rod fixed to said sleeve and extending radially therefrom, and means pivoted to the free end of said rod and to the brakes of said wheels to control the operation of said brakes.

4. In a four wheel brake system, the combination with a frame having brake controlled wheels at opposite ends thereof, a brake rod pivoted to said frame, means connected to said rod to operate all of said brakes simultaneously, said means including a link having one end pivoted to said frame, adjustable means for resisting the swing of said link about its pivotal connection to the frame, a lever pivoted between its ends to the free end of said link, means pivotally connecting the opposite ends of the lever to the brakes at the opposite ends of said frame, an arm extending rigidly from said lever at its pivotal connection with said link, and means connecting said brake rod to the free end of said arm to operate said lever and brake control means connected thereto.

5. In a four wheel brake system, the combination with a frame having brake controlled wheels at opposite ends thereof, of mechanism on said frame for simultaneously operating all of the brakes of said system, said mechanism including a link having one end thereof pivoted to said frame, and yielding means for varying the frictional contact of the pivoted end of said link with said frame.

In witness whereof I have signed this specification.

FREDERICK HENRY ROYCE.